United States Patent
Urbas

[15] 3,678,747
[45] July 25, 1972

[54] APPARATUS AND METHOD FOR MEASURING STEAM AND CONDENSATE FLOWS

[72] Inventor: John C. Urbas, 3415 Francheville, Quebec 10, Quebec, Canada

[22] Filed: April 23, 1971

[21] Appl. No.: 136,941

[52] U.S. Cl. ............................................73/194 R, 73/61.1
[51] Int. Cl. .....................................................F16h 15/08
[58] Field of Search .................73/29, 194 R, 113, 215, 53, 73/61.1, 61.3

[56] References Cited

UNITED STATES PATENTS 3,430,483  3/1969  Clawson et al.........................73/53 X Primary Examiner—Richard C. Queisser
Assistant Examiner—Arthur E. Korkosz
Attorney—Alan Swabey

[57] ABSTRACT

A metering apparatus for measuring steam and condensate flow rate comprising water storing means for supplying a substantially constant flow rate of water at an outlet thereof and a level metering chamber having a mixing chamber therein for receiving the supply of constant flow rate of water. The mixing chamber is provided with adjustable drain means whereby the level of water in the mixing chamber can be adjusted and maintained substantially constant. Means are further provided for introducing steam and condensate in the mixing chamber whereby the steam condensates with the water thereby increasing the water level in the mixing chamber causing overflow in the metering chamber. Indicating means are provided in the metering chamber for measuring the overflow from the mixing chamber whereby the steam and condensate flow rate is measured.

15 Claims, 3 Drawing Figures

INVENTOR
John C. URBAS

*Alan Sinsley*
ATTORNEY

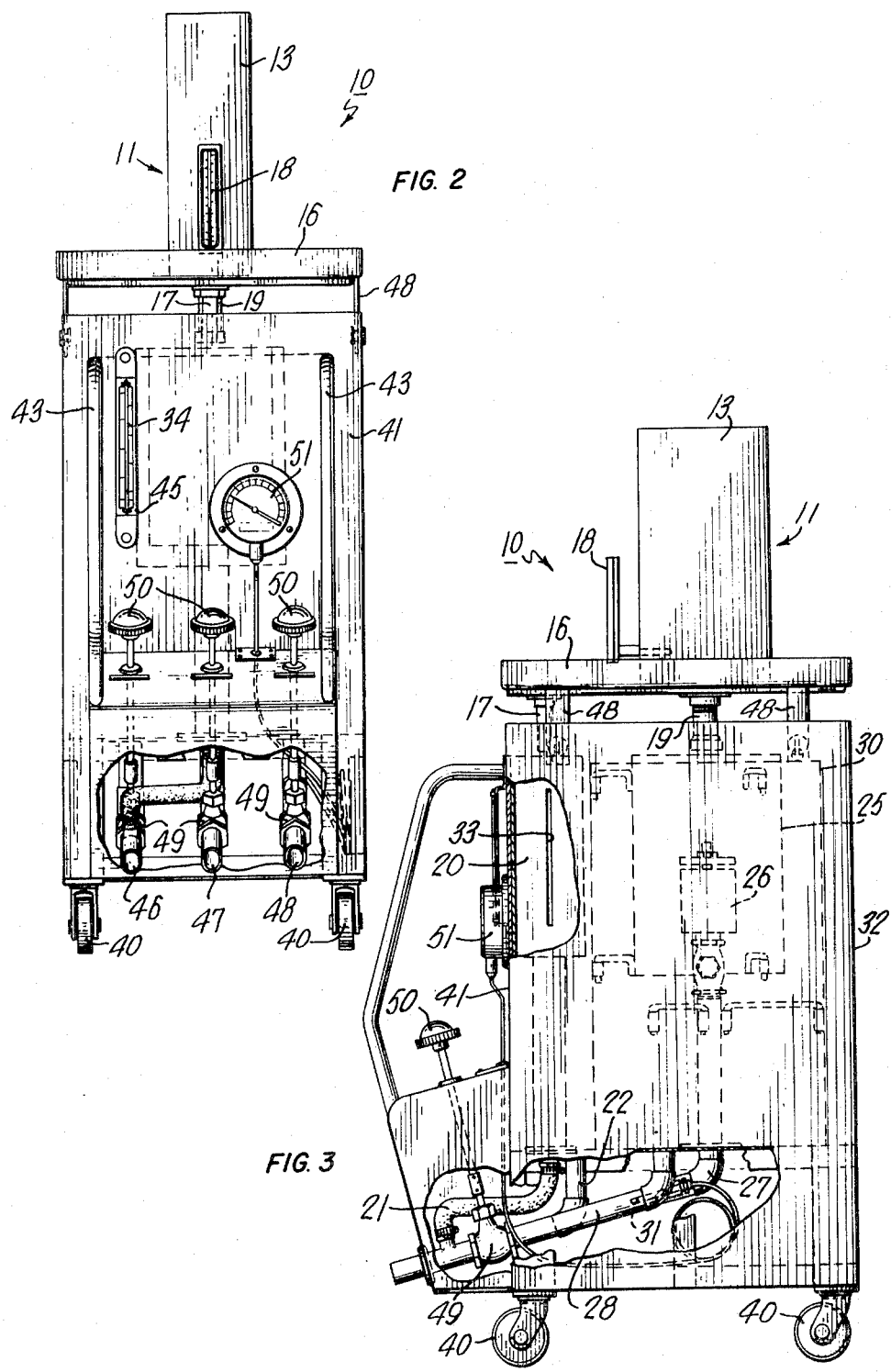

3,678,747

APPARATUS AND METHOD FOR MEASURING STEAM AND CONDENSATE FLOWS

BACKGROUND OF THE INVENTION

1. Field of the Invention

This invention relates to an apparatus and a method for measuring flows and more particularly steam and condensate flows from cylinder type dryers.

2. Description of Prior Art

Steam heated cylinder dryers, as commonly used in web processing, especially paper machines, vary in their heat releasing ability. Either collectively or individually some causes for changes in heat release are steam quality, variable dryer construction, type and operation of condensate removal device, type of material dried and ambient air conditions.

To attain maximum dryer output it is of interest to determine the heat-release ability of each dryer and two measuring methods are commonly employed. One is indirect heat exchange, continuous measurement method and the other the direct heat exchange, batch process method.

The indirect heat exchange, continuous measurement method employs an indirect heat exchanger through which dryer effluent is passed and condensed with cold water. The heat balance calculation reveals the steam and condensate proportions. The bulk and size of equipment are distinct disadvantages in transportation and mobility at the measuring site as well as high capital cost for constructing the apparatus.

The direct heat exchange, batch type method consists of the addition of a measure quantity of dryer effluent to a measured quantity of cold water. Measurements are made using a balance and a stop watch. As in indirect heat exchange method, the heat balance calculation discloses the performance of the dryer. The prime failing of this method is that multiplicity of measurements are needed for accuracy thus expanding manpower costs for given investigations.

SUMMARY OF INVENTION

It is an object of the present invention to provide a metering apparatus for measuring steam and condensate flow rate and which is economical to construct and which is compact and mobile.

Accordingly, from a broad aspect, the present invention provides a metering apparatus for measuring steam and condensate flow rate comprising water storing means for supplying a substantially constant flow rate of water at an outlet thereof. A level metering chamber having a mixing chamber therein and positioned for receiving the constant flow rate of water from the storing means. The mixing chamber has an adjustable drain means whereby the level of water in the mixing chamber can be adjusted and maintained substantially constant. Means are further provided for introducing steam and condensate in the mixing chamber whereby the steam condensates with the water to cause the mixing chamber to overflow in the metering chamber. Indicating means is provided in the metering chamber to measure the overflow from the mixing chamber whereby the steam and condensate flow rate is measured.

It is a further object of the present invention to provide an accurate method for metering steam and condensate flow rate.

Accordingly, from a further broad aspect, the present invention provides a method for metering steam and condensate flow rate comprising the steps of feeding a constant supply of cooling water to a mixing tank, controlling the level of water in the mixing tanks so that the water therein may be adjusted at a constant level; discharging steam and condensate into the water in said mixing tank; and metering the overflow rate of the water from the mixing tank to a metering tank to thereby measure the flow rate of the steam and condensate introduced in the mixing tank.

BRIEF DESCRIPTION OF DRAWINGS

An embodiment of the invention will now be described, by way of example, with reference to the accompanying drawings in which:

FIG. 2 is a front view, partly sectioned, of a preferred embodiment of the metering apparatus; and FIG. 3 is a side view, partly sectioned, of the apparatus shown in FIG. 2.

DESCRIPTION OF PREFERRED EMBODIMENTS

Figure 1:
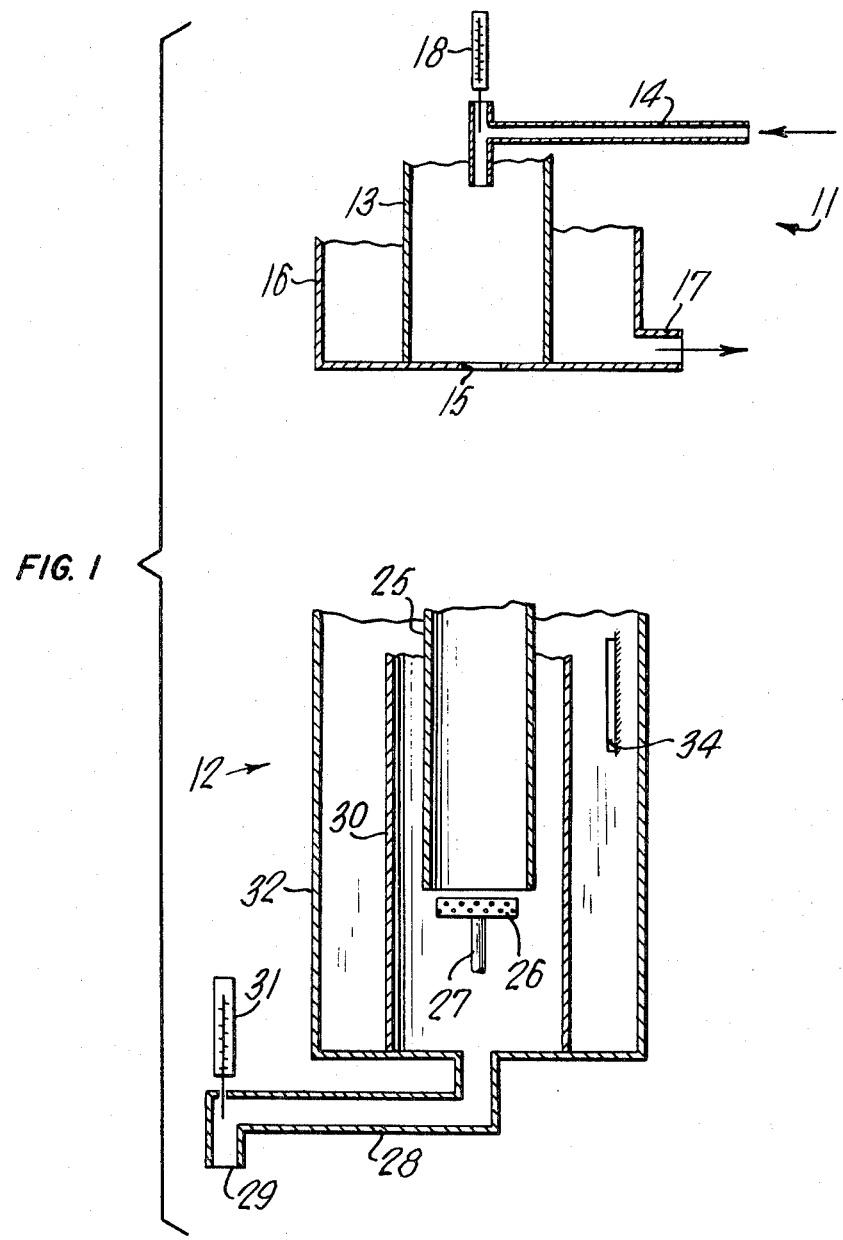
FIG. 1 is a schematic illustration of the metering apparatus.

The metering apparatus 10 will now be described with reference to FIGS. 1 to 3 of the drawings. In FIG. 1, there is illustrated the basic principal of the apparatus as comprising a cold water head tank assembly 11 designed to deliver a constant flow of cold water (sufficient to condensate steam in contact therewith) to the mixing and meter tank assembly 12.

Mill water is supplied to the tank 13 via supply line 14. The water going into the tank 13 is in modest excess of the amount which can flow out of a feed orifice 15 located at the bottom of head tank 13. The feed orifice 15 can be reduced in size by the provision of suitable interchangeable feed pipes 19 (see FIG. 3) which are available in a variety of calibrated sizes to accommodate various steam blow through rate of different size dryers. Head tank 13 is of fixed dimensions to maintain a constant head and therefore constant flow in the orifice 15. The excess or overflow from tank 13 is collected in container 16 and sewered via outlet 17. For all intents and purposes the head changes are negligible in head tank 13 for substantial changes in primary flow to the tank 13. Constant cold water flow is assured even for adverse changes in mill water supply providing naturally that this supply does not drop below the demand of feed orifice 15. A thermometer 18 is installed in contact with the water tank 13 to record the water delivery temperature.

The cold water flowing out of the feed orifice 15 is directed into a separator tube 25 and over a steam distributor head 26 secured in a mixing tank 30. Hereinshown, the steam injector head 26 is perforated and connected to a conduit 27 which in turn connects to a cylinder dryer (not shown) via a suitable connector hose. At the bottom of the mixing tank 30 there is provided an outlet conduit 28 having an orifice 29 therein the size of the orifice being controllable by means of a valve 49 (see FIG. 2). Orifice 29 in conjunction with the height of the mixing tank 30 ensure constant discharge from the mixing tank 30. Proper dimensioning and the disposition of the separator tube 25 and distributor head 26 ensures uniform mixing. The flow from feed pipe 19 (see FIGS. 2 and 3) exceeds the flow at orifice 29 and therefore continuous overflow from the mixing tank 30 into a metering chamber 32 takes place.

A thermometer 31 is located in the outlet conduit 28 at the bottom of the mixing tank 30 to measure the temperature of the water being bled from the mixing tank 30.

The overflow from mixing tank 30 is trapped in chamber 32 and the level of water in chamber 32 is indicated by a calibrated weir gauge 33 located on the wall of a discharge box 20 secured inside the metering chamber 32 on the outside wall thereof. The weir gauge 33 is a long and narrow calibrated slot through which the water, overflowing in the metering chamber 32, will drain when the level of water in chamber 32 reaches the weir gauge 33. A gauge 45 (see FIG. 2) is located on the outer wall of the metering chamber 32 and monitors the level of water passing through the weir 33. A calibration 34 is provided along the gauge to obtain an accurate reading and to provide accurate adjustment of the apparatus before use. As steam and condensate flows are directed to the steam injector head 26 from a dryer (not shown) under investigation, the overflow increases directly as the steam and condensate flow introduced and the difference in the reading on the calibrated weir 34 indicates dryer discharge of condensate and steam. The metering chamber 32 must be level at all times and levelling devices (not shown) are provided for this purpose. Also, more than one weir gauge can be provided on the walls of the discharge box 20 and equipped with closing means whereby they can be readily removed from the apparatus if only one gauge is required.

Referring to FIGS. 2 and 3, there is shown the metering apparatus 10. The parts in contact with condensate or water are constructed of stainless steel. The apparatus 10 is mounted on wheels 40 to render it easily movable and transportable. The cover and headtank assembly 11 is secured to the upper end of the walls of the metering chamber 32 by means of collapsible supports 48, and can be inverted on the chamber 32 to effect a completely sealed top surface. On the front console 41 there is provided a pair of handle bars 43 for ease of handling of the apparatus.

Adjacent the bottom of the console 41 there is located a drain pipe connector 46 which connects to a flexible drain pipe 21 for drainage of the discharge box 20 into which also discharges the container 16 receiving the overflow from tank 13. A valve 49 and pipe 22 is provided to drain the metering chamber 32 after use. A steam supply connector 47 is provided to connect the steam and condensate from the dryer under test to the conduit 27 of the injector head 26. Pipe connector 48 connects to outlet conduit 28 and its valve 49 provided the necessary adjustment for the discharge rate of the contents of the mixing chamber 30 to adjust the water discharge level through the weir gauge 33 prior to operation. Each valve 49 is provided with a respective control knob 50 accessible on the console 41. The thermometer 31 is hereinshown inserted in the pipe 28 and is read from a thermoguide meter 51 located on the console 41. The weir gauge 33 is monitored by the calibration 34 on the console which are clearly visible by the provision of an incline gauge 45 thereover.

The dryer (not shown) is equipped with a quick disconnect fitting to divert condensate into the metering apparatus 10 via connector 47. An interconnecting hose (not shown) has a matching quick disconnect adapter as well as a pressure gauge and regulating valve (not shown). The regulating valve is used to set pressure differentials across the syphon (not shown) as required for the test.

The operation is based on an overflow principle whereby fresh water is metered from the head tank assembly 11 into the mixing tank 30 where steam and condensate, discharging from the dryer and introduced in the tank 30 by injector head 26, mixes violently with the water. This flow meter measures the total condensate and vapor discharge from a cylinder type dryer and the heat balance calculation permits the derivation of the ratio of condensate to vapor in the total flow, the condensate segment being a measure of the heat release ability of the dryer.

Prior to operation of the meter unit 10, the fresh water entering the mixing tank 30 is balanced with the water being removed whereby the head level in the mixing tank is constant, and no overflow from the metering chamber 32 is observed at the weir gauge 33. When steam and condensate enter the mixing tank 30, the water in tank 30 overflows in the metering chamber 32 and consequently the increase in the flow through the weir gauge 33 is a measure of the increase in the water level. The rate of over flow at the calibrated weir 33 is monitored and from this figure the heat release ability of the dryer unit can be calculated. The temperature of the water entering the mixing tank 30 and temperature leaving is a measure of the total heat rise attributable to steam and condensate. The percentage steam blowthrough and condensate flow rates can be determined from a head and material balance.

To effect a connection to the dryer section, it is necessary to install a tee connection (not shown) in the condensate return line and two globe valves (not shown) to permit diversion of steam and condensate from the condenser (not shown) to the condensate meter apparatus 10. The pressure gauge (not shown) on the condensate return line indicates when the back pressure is similar to normal conditions and the flow of condensate to the meter apparatus 10 is representative of that which would be going to a condenser.

The condensate meter unit 10 is equipped with the necessary flexible hose, globe valves, pressure gauge, and one male/female quick disconnect to undertake a complete set of tests on condensate return lines which have been connected in the manner recommended.

It has been determined that a complete evaluation of one dryer would take 15 to 25 minutes, depending on the stability of steam and condensate flow from the dryer.

The meter unit is suitable for steam and condensate flows from 0 to 3,000 lbs. per hour, steam pressures from 2 psig to 120 psig and requires only normal mill water at a maximum flow rate of approximately 160 gallons per minute.

The meter apparatus described herein is approximately 68 inches in height, 23 inches in width and 36 inches in depth.

I claim:

1. A metering apparatus for measuring steam and condensate flow rate comprising, water storing means for supplying a substantially constant flow rate of water at an outlet thereof, a level metering chamber having a mixing chamber therein for receiving said supply of constant flow rate of water, said mixing chamber having adjustable drain means whereby the level of water in said mixing chamber can be adjusted and maintained substantially constant, means for introducing steam and condensate in said mixing chamber whereby said steam condensates with said water increasing the water level in said mixing chamber causing overflow in said metering chamber, indicating means in said metering chamber for measuring said overflow from said mixing chamber whereby said steam and condensate flow rate is measured.

2. A metering apparatus as claimed in claim 1, wherein said water storing means includes a head tank for receiving a substantially constant water supply therein in modest excess to said water flowing out of said outlet located in the bottom thereof, and an overflow container for receiving and discharging overflow of water from said head tank.

3. A metering apparatus as claimed in claim 2, wherein temperature recording means is located within said head tank for monitoring the temperature of the water therein.

4. A metering apparatus as claimed in claim 1, wherein an open-ended separator tube is supported within the upper part of said mixing chamber to receive said water from said outlet of said water storing means therein.

5. A metering apparatus as claimed in claim 1, wherein said adjustable drain means is an outlet pipe having an adjustable orifice therein, said orifice being adjustable to control the level of the water in said mixing chamber.

6. A metering apparatus as claimed in claim 5, wherein said adjustable orifice is a valve connected in said outlet pipe, said valve having regulating means to adjust the passage of fluid through said outlet pipe.

7. A metering apparatus as claimed in claim 1, wherein said means for introducing steam and condensate in said mixing chamber is a perforated injector head located in said mixing chamber and immersed in said water in said mixing chamber whereby said steam and condensate mixes with the water when released, said steam condensating when in contact with said water.

8. A metering apparatus as claimed in claim 4, wherein a perforated injector head is supported within said open-ended cylinder.

9. A metering apparatus as claimed in claim 1, wherein said indicating means is a calibrated, substantially elongated rectangular slot disposed in a vertical plane on the wall of a water discharge box located within said metering chamber whereby water adjacent said slot will drain therethrough thereby indicating the level of water in said metering chamber whereby the flow rate of said steam and condensate introduced in said mixing chamber can be calculated.

10. A metering apparatus as claimed in claim 9, wherein said elongated rectangular slot is a weir gauge having a calibrated scale along its longitudinal axis.

11. A metering apparatus as claimed in claim 1, wherein said metering chamber is a substantially rectangular housing having an open upper end and a closed lower end supported on wheels, a cylindrical mixing tank supported in fixed relationship within said housing, an open-ended cylindrical tube supported with the upper end of said housing and disposed concentrically with said housing, a perforated injector head fixedly secured on the central axis in said tube, conduit connectors extending from the lower end of said housing, one of said connectors being connected to said discharge compartment for drainage, said second connector providing connection of said steam and condensate to an injector head in said mixing chamber, said third connector being connected to said outlet pipe having an adjustable orifice therein.

12. A metering apparatus as claimed in claim 11, wherein said water storing means includes a head tank and an overflow container secured above the open end of said rectangular housing and adapted to be inverted so as to provide a closed upper end when said metering apparatus is not in use.

13. A method for metering steam and condensate flow rate comprising the steps of
  i. feeding a constant supply of cooling water to a mixing tank,
  ii. controlling the level of water in said mixing tank so that said water therein may be adjusted to a constant level,
  iii. discharging steam and condensate into said mixing chamber below said constant water level, and
  iv. metering the overflow rate of water from said mixing tank into a metering tank to thereby measure the flow rate of said steam and condensate introduced in said mixing chamber.

14. A method as claimed in claim 13, wherein said ii step includes the steps of
  a. controlling the level of water in said mixing tank to cause said water to over flow in a metering chamber,
  b. adjusting the level of water in said mixing tank when a desirable level of water in said metering chamber is obtained, so that the water level in said mixing tank no longer overflows and is maintained substantially constant.

15. A method as claimed in claim 13, wherein there is further provided the step of
  v. metering the water temperature of said constant supply and also of said water in said mixing chamber.

* * * * *